United States Patent [19]

Wenger

[11] Patent Number: 5,394,734
[45] Date of Patent: Mar. 7, 1995

[54] APPARATUS FOR DETERMINING HUMIDITY CONCENTRATION IN A HUMIDIFIED AIR SYSTEM

[75] Inventor: Paul Wenger, Ditzingen, Germany

[73] Assignee: LTG Lufttechnische Gesellschaft mit beschrankter Haftung, Stuttgart, Germany

[21] Appl. No.: 115,284

[22] Filed: Aug. 31, 1993

[30] Foreign Application Priority Data

Sep. 2, 1992 [DE] Germany .......... 42 29 173.9

[51] Int. Cl.$^6$ .......... B01F 3/02; G01N 31/00
[52] U.S. Cl. .......... 73/29.01; 62/176.4; 236/44 R
[58] Field of Search .......... 236/44 R; 62/176.4, 62/121, 171; 165/19; 73/24.04, 29.01

[56] References Cited

U.S. PATENT DOCUMENTS

| | | | |
|---|---|---|---|
| 2,492,768 | 12/1949 | Schaefer | 73/29.01 |
| 2,681,571 | 6/1954 | Becker | 3/29.01 X |
| 3,498,108 | 3/1970 | Ruskin et al. | 73/29.01 |

*Primary Examiner*—William E. Wayner
*Attorney, Agent, or Firm*—Anderson Kill Olick & Oshinsky

[57] ABSTRACT

The invention is directed to an apparatus for determining the mist concentration in a humidified air flow of a ventilating device, preferably a ventilating or air-conditioning installation. It is characterized by a plurality of moisture precipitation elements (12) having different geometrical dimensions which are arranged in the air flow (2) and are provided with a moisture sensor device (9). The invention is further directed to an air washer for humidifying an air flow in a ventilating installation.

15 Claims, 3 Drawing Sheets

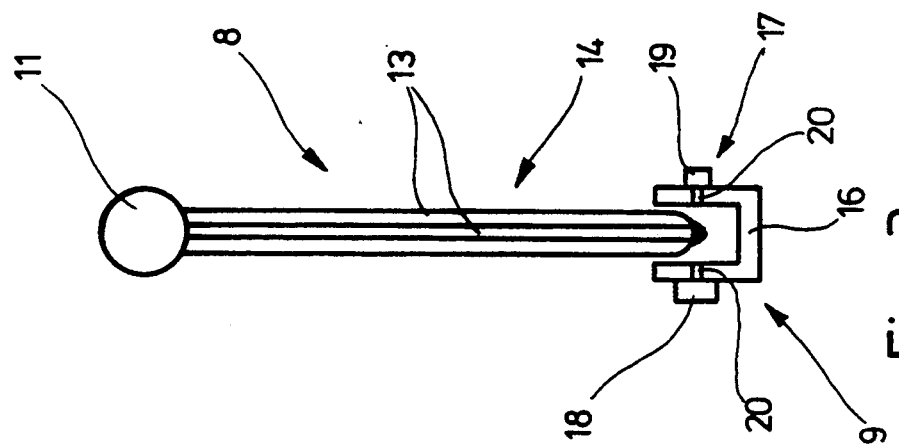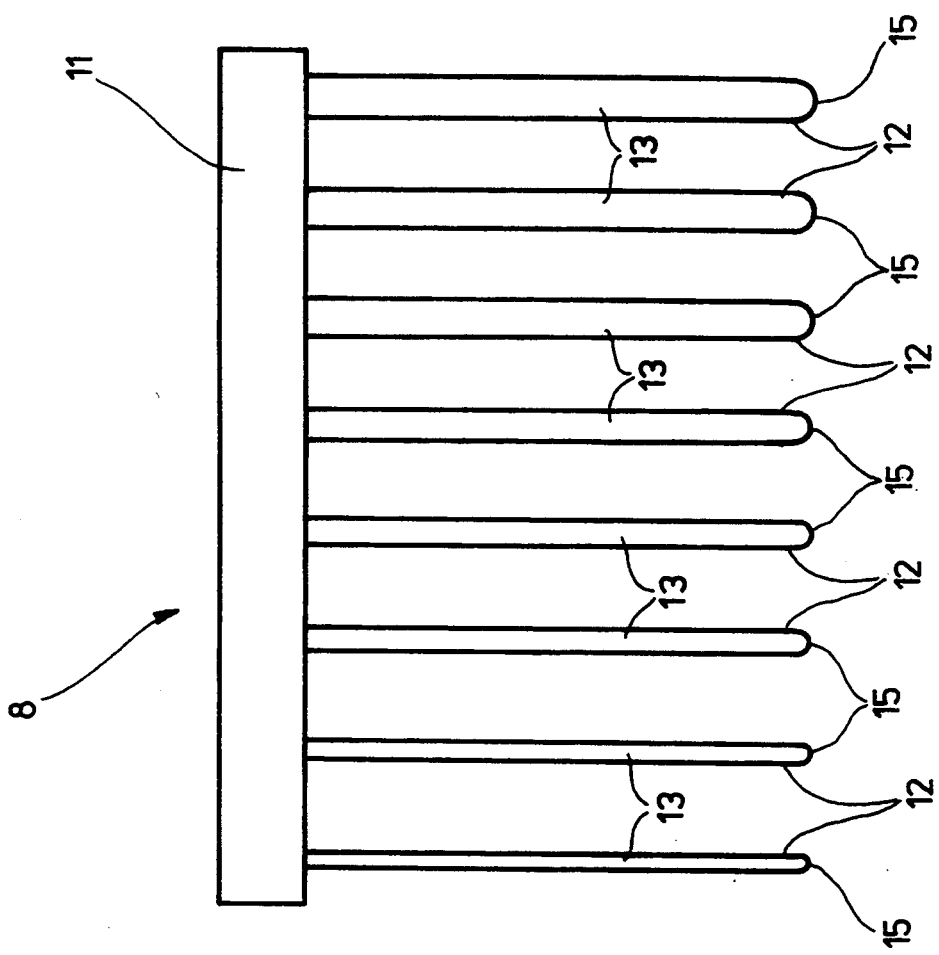

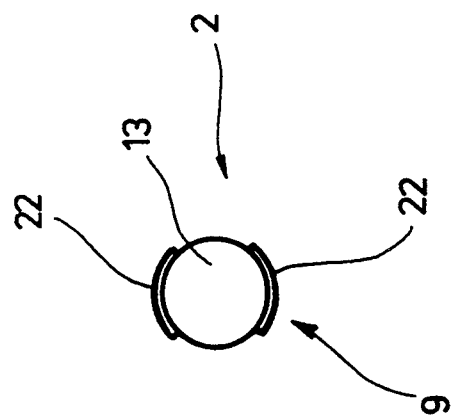
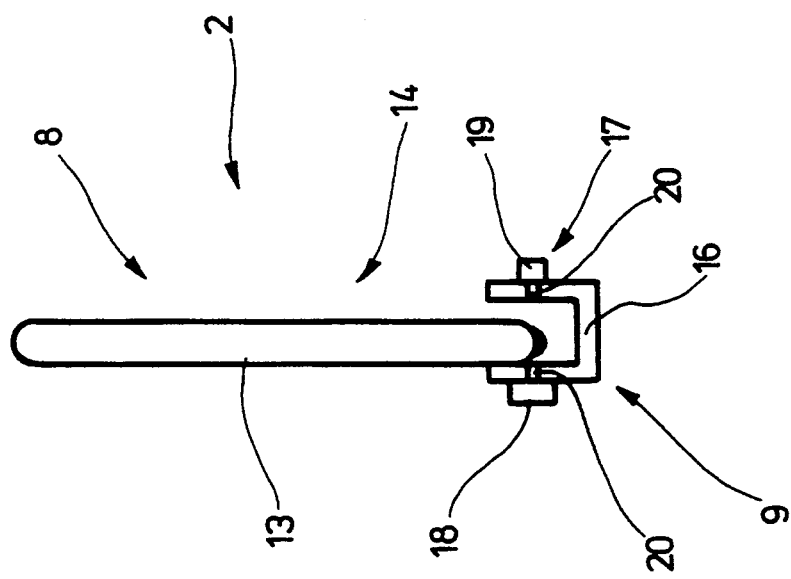

APPARATUS FOR DETERMINING HUMIDITY CONCENTRATION IN A HUMIDIFIED AIR SYSTEM

BACKGROUND OF THE INVENTION

The invention is directed to an apparatus for determining the mist concentration in a humidified air flow of a ventilating device, preferably a ventilating or air-conditioning installation.

In many areas of air treatment technology, particularly ventilating and air-conditioning installations, it is necessary to prepare the air to be used, i.e. to filter it, if necessary, to adjust its temperature and/or to influence its humidity.

The humidification of air by means of an atomizing nozzle arrangement is known. Atomizing nozzles which atomize the humidifying medium, in particular water, are arranged in a stream of air generated by positive guidance. However, there are also other alternative humidifying systems, e.g. trickling humidifiers or humidification by atomization of water by means of the impeller of a ventilator or humidification by means of centrifugal humidifiers.

An intensive mass transfer between the air and the humidifying medium is always desired in order to achieve a high humidifying efficiency with the lowest possible expenditure. However, the concentration of mist in the air (downstream of the water separator, as the case may be) should not exceed an upper limit so as not to lead to precipitation in the form of water drops so that the devices arranged downstream in the ventilating installation, e.g. a duct system, remain dry. When this degree of mist concentration is exceeded, unwanted precipitation is formed.

A water separator which separates larger drops of water from the air flow and only allows the fine mist to pass is usually arranged downstream of the humidifying apparatus. Thus, the mist concentration in the air after passing the water separator must be adjusted in such a way that precipitation of moisture is prevented on the one hand, but the mist concentration is maintained at a permissible limit on the other hand so that e.g. the cooling output of the ventilating installation is as high as possible. In so doing, the air is in a state of oversaturation; it has very small water droplets (mist) up to a determined drop size. If this drop size and a determined amount of water mist is exceeded, unwanted precipitation of moisture occurs.

The use of a moisture gauge which measures the relative air humidity, e.g. in a steam humidifier, is known for limiting mist concentration. However, there is no measuring device which can reliably measure 100% relative humidity. At best, 95% relative humidity can be reliably measured. Accordingly, the humidification output of the washer is limited only by the measuring device, since a 100% saturation of the air and a permissible amount of mist which can evaporate subsequently is impossible.

The value determined by the moisture measuring instrument is accordingly used to influence the humidifying device, e.g. the supply of water to the atomizing nozzles.

The present invention therefore has the object of providing an apparatus for determining the mist concentration in a flow of air in a ventilating device which has a simple construction and is reliable and can be installed at an .optional location downstream of the air humidifying device. This apparatus should maximize the adiabatic cooling output of a RLT installation by means of reevaporation of free droplets of mist on the one hand and, on the other hand, should prevent precipitation of water at the parts located downstream of the humidifying device which serve to guide the air.

SUMMARY OF THE INVENTION

This object is met, according to the invention, by a plurality of moisture precipitation elements having different geometrical dimensions which are arranged in the air flow and provided with a moisture sensor device. When a determined mist concentration in the air flow is exceeded, i.e. when the oversaturation is too great, moisture, in particular water, precipitates at the moisture precipitation elements. Due to the different geometrical dimensions of these moisture precipitation elements, this is effected in such a way that moisture first precipitates at the moisture precipitation elements having the smallest dimensions and this precipitation is detected by the associated moisture sensor device. Accordingly, depending on the magnitude of the mist concentration, a corresponding number of moisture precipitation elements will have moisture and the moisture precipitation elements having greater dimensions or the greatest dimensions will only have moisture precipitation when there is an extremely high impermissible mist concentration. The number of moisture precipitation elements with precipitation—starting with those with the smallest geometrical dimensions—accordingly represents a measurement for the existing oversaturation. The moisture sensor device can then react on the humidifying device in a corresponding manner and adjust the latter in such a way that a mist concentration is adjusted only within a permissible range. This may be effected by controlling or regulating.

According to a further development of the invention the moisture precipitation elements are constructed as rods of various thickness. As the oversaturation of the air increases, the least thick rod is the first to form precipitated moisture.

The rods preferably have circular cross section of varying diameter.

According to a preferred embodiment form of the invention, the rods are arranged so as to be suspended in the flow of air, the moisture sensor device being arranged in the area of their lower ends. This moisture sensor device may operate optically, for example, particularly so as to detect forming drops of moisture (water drops) which run toward the end of the rod. Another possibility consists in an electrical resistance measurement carried out by the moisture sensor device in order to determine precipitated moisture on the rods. Hygroscopic material may be also used.

The moisture sensor device is preferably constructed in such a way that a sensor is associated with every individual moisture precipitation element so that changing conditions can be detected (for example, some of the moisture precipitation elements may already show precipitated moisture, while others do not or, as the case may be, no longer show any precipitated moisture).

The rods are preferably arranged next to one another in a row and the longitudinal direction of the row of rods extends transversely, preferably vertically, to the direction of the air flow. The direction of the rod itself is preferably likewise aligned vertically to the flow of air. In particular, the rods can be arranged so as to extend vertically or diagonally relative to the vertical line.

The invention is also directed to an air washer for humidifying an air flow of a ventilating installation, particularly a ventilating or air-conditioning installation, with a liquid atomizing device arranged in the air flow, wherein a moisture sensor device determines the mist concentration and controls or regulates the liquid atomizing device in such a way that precipitation of moisture is prevented within the ventilating installation. Accordingly, it is possible by controlling or regulating the amount of moisture (water) supplied to the atomizing device to provide a maximum mist concentration in the air flow which nevertheless does not lead to precipitation. The amount of water is controlled or regulated as a function of the measurements taken by the moisture sensor device. According to the preceding, this is preferably formed by moisture precipitation elements with different geometrical dimensions. Precipitation first forms at the moisture precipitation elements with the smallest dimensions. This is detected and shows that oversaturation is present, which is desirable. As the oversaturation increases, the next thickest rods show precipitation demonstrating that the water supply is within the range of adjustment. Impermissibly high oversaturation is indicated only when the thickest rods show water precipitation and must be eliminated as quickly as possible by appropriately reducing the supply of water.

Further, the atomizing device is advantageously a high-pressure atomizing device. It preferably has high-pressure nozzles for atomizing the liquid which are operated at a pressure of 20 to 600 bar. Of course, alternatively, it is also possible to use a low-pressure atomizing device.

The mist concentration can be adjusted by controlling or regulating the atomizing pressure. The atomizing pressure can preferably be adjusted by controlling or regulating the speed of a high-pressure pump which feeds the high-pressure nozzles. Alternatively, it is also possible to control or regulate the mist concentration via a by-pass in the water flow with adjustable regulating valve at constant speed of the high-pressure pump. Additionally or alternatively, it is also possible when a plurality of high-pressure nozzles are provided to control or regulate the mist concentration by turning on or turning off individual high-pressure nozzles.

A further possibility of influencing the mist concentration consists in changing the water separator on the basis of the signals from the oversaturation measuring device.

DESCRIPTION OF THE DRAWINGS

The drawings show the invention with reference to an embodiment example. In the drawings:

FIG. 2 shows the apparatus for determining the mist concentration as seen from the top;

FIG. 3 shows a side view of the apparatus in FIG. 2 which is outfitted in addition with a moisture sensor device;

FIG. 4 shows another embodiment example of an apparatus according to FIG. 3;

FIG. 5 shows a view from below of a rod of the apparatus.

DETAILED DESCRIPTION OF THE PREFERRED EMBODIMENT

Figure 1:
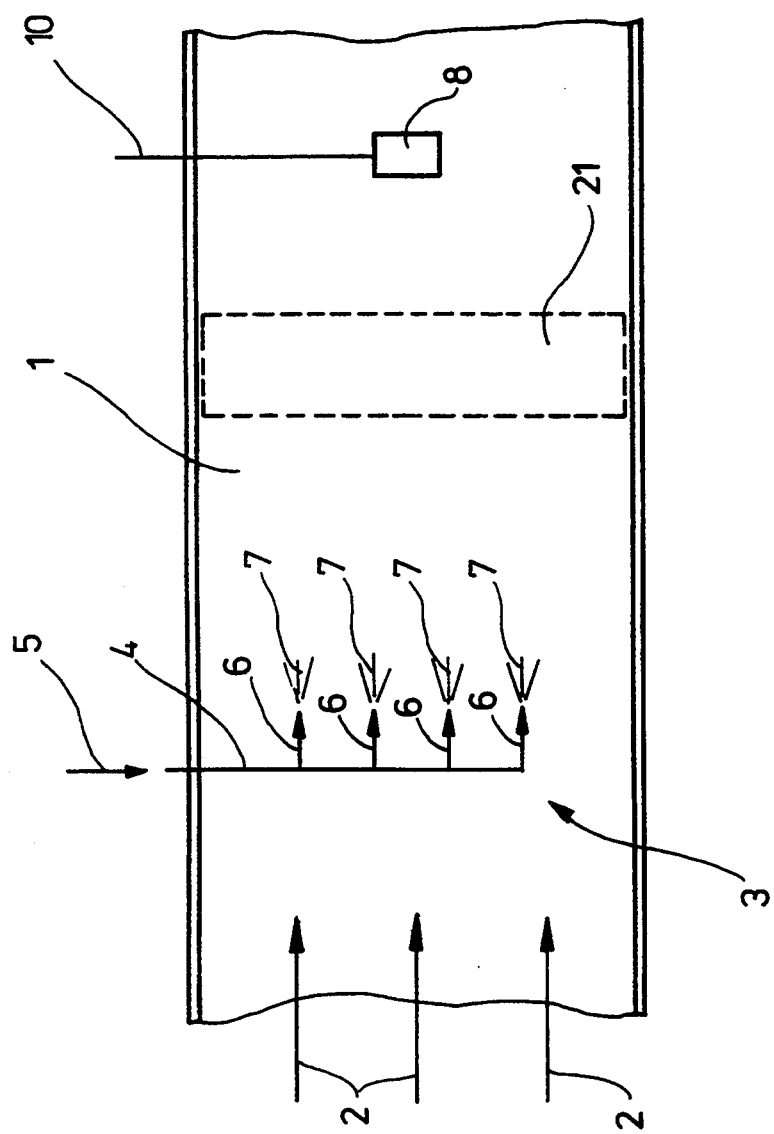
FIG. 1 shows a longitudinal section through a nozzle chamber which has a liquid atomizing device and an apparatus for determining the mist concentration.

FIG. 1 shows a longitudinal section through a nozzle chamber 1 which is a component part of a ventilating arrangement, not shown in the drawing, e.g. a ventilating and air-conditioning installation. An air flow 2 is moved through the nozzle chamber 1 by means of a suitable device and passes a high-pressure atomizing device 3. The high-pressure atomizing device 3 has a pipe system 4 which is fed with water originating from a high-pressure pump, not shown. High-pressure nozzles in a planar matrix arrangement are connected to the pipe system 4 and atomize the water 5 in the form of atomizing cones 7 so that it can be partially absorbed by the air flow 2 and accordingly leads to a corresponding mist concentration in the air flow 2.

An apparatus 8 for determining the mist concentration in the humidified air flow 2 is provided downstream of the high-pressure atomizing device 3. The apparatus 8 is provided with a liquid sensor device 9 (FIG. 3) whose measured values are fed, via a line 10, to a control device or regulating device, not shown in the drawing. This apparatus influences the amount of moisture (water) fed to the high-pressure nozzles 6, as appropriate, in such a way that the oversaturation of the air adjusted downstream of the nozzle chamber 1 is never so high that a precipitation of moisture occurs in the ventilating device.

Insofar as the atomizing nozzles only produce very fine mist, water separators may be dispensed with. If this is not the case, a water separator 21 is inserted prior to the measuring device (liquid sensor device 9). If this water separator 21 is adjustable, i.e. if the degree of separation of the size of the droplets of water can be adapted by changing the air deflection path of the separator, it can also be utilized for controlling the mist concentration.

FIG. 2 shows a top view of the apparatus 8 for determining the mist concentration. It includes a supporting pipe 11 at which a plurality of moisture precipitation elements 12 are arranged. The moisture precipitation elements 12 have different geometrical dimensions. They are constructed as rods 13 having a circular cross section with different diameters. The rods 13 are arranged adjacent to one another in a row at the supporting pipe 11 so that a row 14 of rods is formed (FIG. 3). The individual rods 13 extend parallel to and at a distance from one another and have rounded portions 15 at their ends remote of the supporting pipe 11. The different diameters of the rods 13 are selected in such a way that they increase from left to right as seen in FIG. 2. All of the rods 13 are of equal length.

According to FIG. 3—which shows a side view of the apparatus, but shows only the first and last rods for the sake of simplicity—the liquid sensor devices 9 are arranged in the region of the rounded portions 15 of the rods 13. They have a U-shaped section 16 in which the ends of the rods 13 engage. An optical device 17 which includes a light transmitter 18 and a light receiver 19 is associated with the rounded portion 15 of each rod 13. The light transmitter 18 is located on one side of the U-section 16 and the light receiver 19 is arranged on the other side of the U-section 16. The legs of the U-section 16 are provided with openings 20 which allow the light beams of the optical device 17 to pass through. The optical device 17 provided at each rod 13 forms a sensor which monitors the rounded portion 15 in question for the formation of drops of liquid. When moisture precipitates at a rod 13, a drop is formed and the drop runs toward the rounded portion 15 of the corresponding rod 13 and is detected by the optical device 17. Corresponding data information is then relayed via the line 10 and a control or regulating device, not shown, which influences the supply of water to the high-pressure atomizing device 3.

The supporting pipe 11 is arranged in the nozzle chamber 1 transversely to the direction of the air flow 2, in particular vertically relative to the direction of the air flow 2, in such a way that the longitudinal axes of the rods 13 hang down vertically.

During operation of the nozzle chamber 1, the air flow 2 is humidified by means of the high-pressure atomizing device 3 and the humidified, oversaturated air then reaches the apparatus 8. Depending on the degree of saturation, moisture may precipitate on the rods 13 and a drop will be formed first on rods 13 of smaller diameter. As operation continues, the high-pressure atomizing device 3 can be controlled by the liquid sensor device 9 in such a way that the rods 13 with the smallest diameters always show liquid precipitation indicating the desired permissible oversaturation, while the rods 13 of medium diameter initiate a controlling or regulating of the water supply and the water separator 21, as the case may be, so that the permissible oversaturation is not exceeded. The thickest rods 13 must remain dry so that the air-guidance elements downstream of the humidifier remain dry. The occurrence of precipitation at these latter rods therefore serves as a reliable limit of the oversaturation to the permissible amount.

According to FIG. 1, the moisture separator 21 can be arranged in the nozzle chamber 1 downstream of the apparatus 8. The moisture separator 21 allows very small droplets of water to pass, but intercepts larger droplets and returns them to the water circulation. The moisture separator 21 is preferably located between the atomizing device and the apparatus 8.

FIG. 4 shows another embodiment example of an apparatus 8 which substantially corresponds to the embodiment example in FIG. 3. However, the rods 13 are not fastened at a supporting pipe 11, but rather are connected directly with a leg of the U-section 16 on the side remote of the air flow 2.

FIG. 5 shows a view from below of one of the rods 13 of another embodiment form which is provided with two electrodes 22 as moisture sensor device 9. The rod 13 is made of material which is not electrically conductive. The two electrodes 22 are located diametrically opposite one another on the outside of the rod 13. If moisture precipitates on the rod 13, the coating of moisture produces a connection of varying degrees of conductivity between the two electrodes 22 so that the occurring electrical resistance is used as a signal for controlling or regulating the humidifying device. FIG. 5 shows only one rod 13 with electrodes 22. Of course, such electrodes 22 are provided at all rods 13 of the row 14 of rods.

I claim:

1. An apparatus for determining the mist concentration in a humidified air flow of a ventilating device, said apparatus comprising:
   a plurality of moisture precipitation elements to be arranged in the humidified air flow and having different geometrical dimensions; and
   a plurality of moisture sensor devices associated with said plurality of moisture precipitation elements, respectively.

2. An apparatus according to claim 1, wherein the moisture precipitation elements are formed as rods having different thicknesses.

3. An apparatus according to claim 1, wherein the moisture precipitation elements are formed as rods having circular cross-sections of different diameters.

4. An apparatus according to claim 1, further comprising means for supporting said plurality of moisture precipitation elements, said moisture precipitation elements being formed as rods attached to said supporting means at one end of said rods, and said moisture sensor devices being arranged at free ends of said rods, respectively.

5. An apparatus according to claim 1, further comprising an elongate member for supporting said plurality of moisture precipitation elements, said moisture precipitation elements being formed as rods attached to said elongate member one after another in a spaced relationship to each other and parallel to each other so as to form a row of rods suspended from said elongate member to extend substantially vertically in the humidified air flow.

6. An apparatus for humidifying air of a ventilating device, said apparatus comprising a chamber, through which a stream of air flows; liquid atomizing means arranged in said chamber for humidifying air flowing through said chamber; and moisture sensor means for determining mist concentration in a humidified air flow and for controlling operation of said liquid atomizing means in accordance with a measured mist concentration, said moisture sensor means comprising:
   a plurality of moisture precipitation elements to be arranged in the humidified air flow and having different geometrical dimensions; and
   a plurality of moisture sensor devices associated with said plurality of moisture precipitation elements, respectively.

7. An apparatus according to claim 6, wherein said liquid atomizing means comprises a high-pressure atomizing device.

8. An apparatus according to claim 7, wherein said high-pressure atomizing device comprises a plurality of high-pressure nozzles.

9. An apparatus according to claim 7, wherein said liquid atomizing means comprises a moisture separator arranged downstream of said high-pressure atomizing device.

10. A method of humidifying air of a ventilating device, comprising the steps of providing a chamber equipped with liquid atomizing means; directing an air flow through the chamber and humidifying air therein; sensing mist concentration in humidified air flow; and controlling operation of the liquid atomizing means in accordance with a measured mist concentration to adjust the mist concentration to a predetermined value, wherein said sensing mist concentration step includes providing moisture sensor means for sensing mist concentration and comprising:
   a plurality of moisture precipitation elements to be arranged in the humidified air flow and having different geometrical dimensions; and
   a plurality of moisture sensor devices associated with said plurality of moisture precipitation elements, respectively.

11. A method according to claim 10, wherein said operation controlling step includes controlling an atomizing pressure of the liquid atomizing means.

12. A method according to claim 11, wherein said pressure controlling step includes controlling a speed of a high-pressure pump feeding the liquid atomizing means.

13. A method according to claim 10, wherein said pressure controlling step includes providing a control valve for by-passing water flow supplied to the liquid atomizing means by a constant speed high-pressure pump.

14. A method according to claim 10, wherein the liquid atomizing means comprises a plurality of high-pressure nozzles, said operation controlling steps including turning on-off individual nozzle in accordance with the measured mist concentration.

15. A method according to claim 10, wherein the liquid atomizing means comprises a liquid atomizing device and a moisture separator arranged downstream of the liquid atomizing device, said operation controlling step including adjusting a degree of separation of the moisture separator.

* * * * *